US009838525B2

(12) United States Patent
Bietz et al.

(10) Patent No.: US 9,838,525 B2
(45) Date of Patent: Dec. 5, 2017

(54) SYSTEMS AND METHODS FOR COUPLING AUXILIARY DEVICES TO A UTILITY METER

(71) Applicant: General Electric Company, Schenectady, NY (US)

(72) Inventors: Steven Lee Bietz, Cumming, GA (US); Jesus Acosta-Cazaubon, Atlanta, GA (US); Christopher Hett, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 14/147,239

(22) Filed: Jan. 3, 2014

(65) Prior Publication Data
US 2015/0195394 A1   Jul. 9, 2015

(51) Int. Cl.
*G06F 21/00* (2013.01)
*H04L 29/06* (2006.01)
*H04M 1/725* (2006.01)
*H04W 12/06* (2009.01)
*H04L 29/08* (2006.01)
*H04W 4/20* (2009.01)

(52) U.S. Cl.
CPC ......... *H04M 1/7253* (2013.01); *H04W 12/06* (2013.01); *H04M 2250/52* (2013.01)

(58) Field of Classification Search
CPC ..... H04M 1/7253; H04W 12/06; G01R 21/00
See application file for complete search history.

(56) References Cited

U.S. PATENT DOCUMENTS

| 2010/0306533 | A1* | 12/2010 | Phatak | G06F 21/34 |
| --- | --- | --- | --- | --- |
| | | | | 713/156 |
| 2013/0046695 | A1* | 2/2013 | Acosta-Cazaubon | G06Q 50/06 |
| | | | | 705/63 |
| 2013/0176141 | A1* | 7/2013 | LaFrance | G08C 17/02 |
| | | | | 340/870.02 |
| 2013/0297087 | A1* | 11/2013 | Koster | H04Q 9/00 |
| | | | | 700/291 |
| 2014/0189722 | A1* | 7/2014 | Shetty | H04N 21/442 |
| | | | | 725/14 |

FOREIGN PATENT DOCUMENTS

EP   2863182 A1 *  4/2015   ............. G01D 4/00

OTHER PUBLICATIONS

Nitesh Saxena, Md. Borhan Uddin, Jonathan Voris; "Universal device pairing using an auxiliary device"; Jul. 2008; SOUPS '08: Proceedings of the 4th symposium on Usable privacy and security; Publisher: ACM; pp. 1-12.*

* cited by examiner

*Primary Examiner* — Shewaye Gelagay
*Assistant Examiner* — Courtney Fields

(57) ABSTRACT

A non-transitory computer-readable medium having code stored thereon, the code includes instructions to receive an indication to communicatively couple a utility meter to an auxiliary device via a mobile electronic device, and capture a visual representation of a unique identifier of the utility meter via the mobile electronic device. The unique identifier includes an authentication mechanism configured to establish a first authentication and a second authentication of a user of the mobile electronic device. The code includes instructions to receive an acknowledgement to communicatively couple the mobile electronic device to the utility meter when the first authentication and the second authentication are satisfied.

18 Claims, 3 Drawing Sheets

SYSTEMS AND METHODS FOR COUPLING AUXILIARY DEVICES TO A UTILITY METER

BACKGROUND

The invention relates generally to utility meters, and more specifically to systems and methods for coupling auxiliary devices to the utility meters.

Certain energy infrastructure, such as electric power transmission and distribution grids, may include a variety of systems and components with sensors and detection devices to detect and analyze energy data. In the energy grid example, systems may include power generation systems, power transmission systems, power distribution systems, smart utility meters, digital communications systems, control systems, and their related components. Certain smart utility meters may be used to control or regulate energy consumption of various auxiliary electrical devices (e.g., domestic electrical devices). Unfortunately, connecting and/or commissioning such auxiliary devices to be used with the utility meters and other metering infrastructure may be very complex and time-consuming. It may be useful to provide methods to facilitate the connection of the utility meters to auxiliary devices.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a non-transitory computer-readable medium having code stored thereon, the code includes instructions to receive an indication to communicatively couple a utility meter to an auxiliary device via a mobile electronic device, and capture a visual representation of a unique identifier of the utility meter via the mobile electronic device. The unique identifier includes an authentication mechanism configured to establish a first authentication and a second authentication of a user of the mobile electronic device. The code includes instructions to receive an acknowledgement to communicatively couple the mobile electronic device to the utility meter when the first authentication and the second authentication are satisfied.

In a second embodiment, a non-transitory computer-readable medium having code stored thereon, the code includes instructions to receive an indication to connect a utility meter to a peripheral device via a handheld electronic device, and to detect a unique identifier of the utility meter via the handheld electronic device. The unique identifier includes a multifactor authentication mechanism configured to establish a first authentication and a second authentication of a user of the handheld electronic device. The code includes instructions to receive an acknowledgement to connect the handheld electronic device to the utility meter when the first authentication and the second authentication are satisfied.

In a third embodiment, a system includes a utility meter configured to record a utility consumption. The utility meter includes a displayable unique identifier. The system includes a first electronic device configured to capture the displayable unique identifier of the utility meter. The displayable unique identifier includes an authentication mechanism configured to establish a first authentication and a second authentication of a user of the first electronic device as a condition for the first electronic device to communicatively access the utility meter. The system includes a second electronic communicatively coupled to the utility meter and the first electronic device and configured to grant the communicative access of the first electronic device to the utility meter when the first authentication and the second authentication are satisfied.

DRAWINGS

These and other features, aspects, and advantages of the present invention will become better understood when the following detailed description is read with reference to the accompanying drawings in which like characters represent like parts throughout the drawings, wherein.

Figure 2:
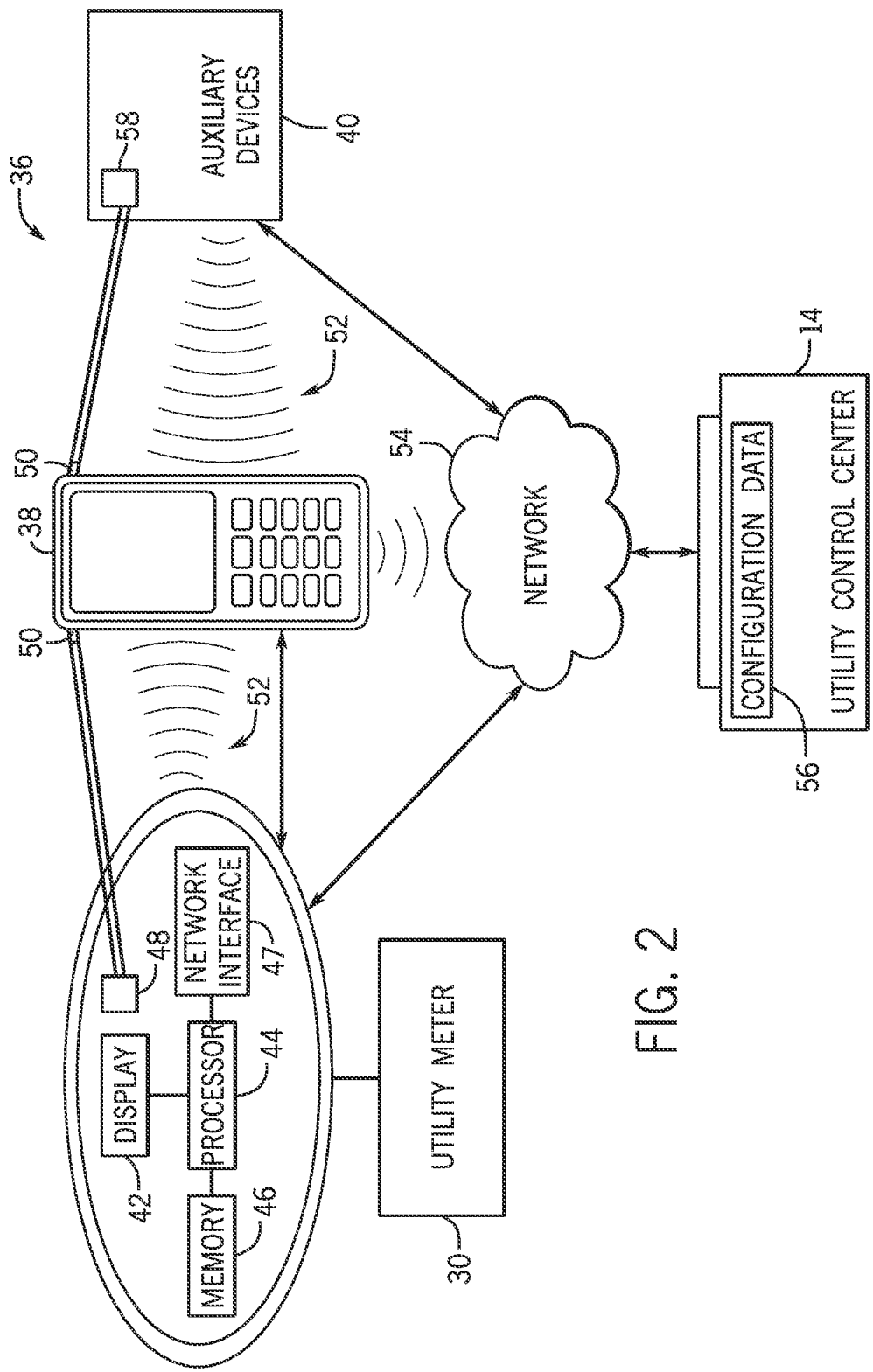
FIG. 2 is a block diagram of an embodiment of a metering system including a mobile electronic device, in accordance with present embodiments.
Figure 3:
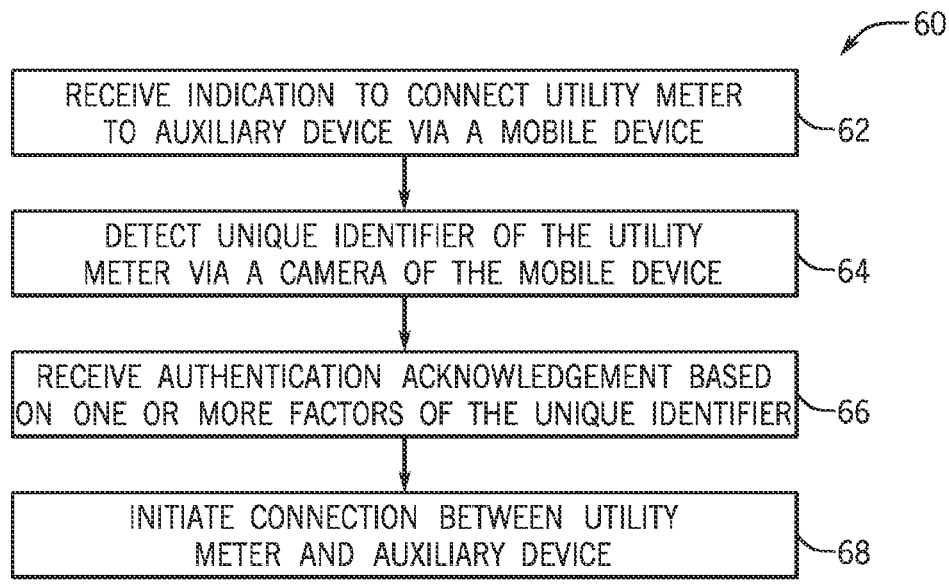
Figure 4:
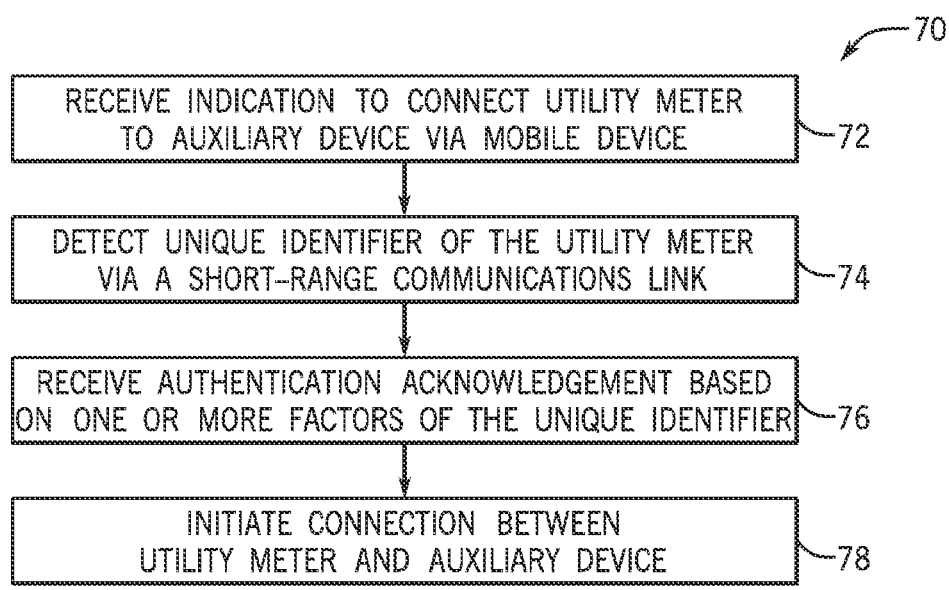

FIG. 3 is a flowchart illustrating an embodiment of a process for authenticating and/or authorizing the mobile electronic device of FIG. 2 via an optical detection to communicatively couple a utility meter to one or more auxiliary devices, in accordance with present embodiments; and FIG. 4 is a flowchart illustrating an embodiment of a process for authenticating and/or authorizing the mobile electronic device of FIG. 2 via a short-range communication channel to communicatively couple the utility meter to the one or more auxiliary devices, in accordance with present embodiments.

DETAILED DESCRIPTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods for communicatively coupling a mobile electronic device (e.g., a cell phone) to a utility meter to commission and synchronize one or more domestic auxiliary devices (e.g., indoor consumer appliances, outdoor electrical equipment, and so forth) with the utility meter. In particular, the mobile electronic device may retrieve a unique identifier of the utility meter, and request authentication and/or authorization from, for example, the utility provider to access certain functionalities of the utility meter. In certain embodiments, the authentication and/or authorization mechanism to couple the mobile electronic device to the utility meter may include two-factor authentication (TFA) or a multifactor authentication (MFA) mechanism that may require a user (utility technician or utility consumer) to satisfy at least two levels of authentication before being granted access to certain functionalities of the utility meter. However, once authenticated and/or authorized to access the utility meter by, for example, the utility provider, the mobile electronic device may be used as a gateway that may then directly couple present auxiliary devices or future auxiliary devices to the utility meter. The mobile electronic device may also be used to update, or request update to one or more operational parameters of the utility meter upon being granted to access to the utility meter functionality. In this way, the utility provider may not need to dispense technicians, for example, to the residences of consumers each time a new auxiliary device is to be coupled to the utility meter. Thus, the present embodiments may vastly facilitate the coupling of auxiliary devices to utility meters, and by extension, to the utility providers, and may also provide for improved security in authenticating and/or authorizing users requesting access to such utility meters. Indeed, it should be appreciated that the techniques described herein may not be limited to electricity meters, but may also be extended to any utility meter such as gas meters, water meters, aeration meters, sewerage meters, and the like.

Figure 1:
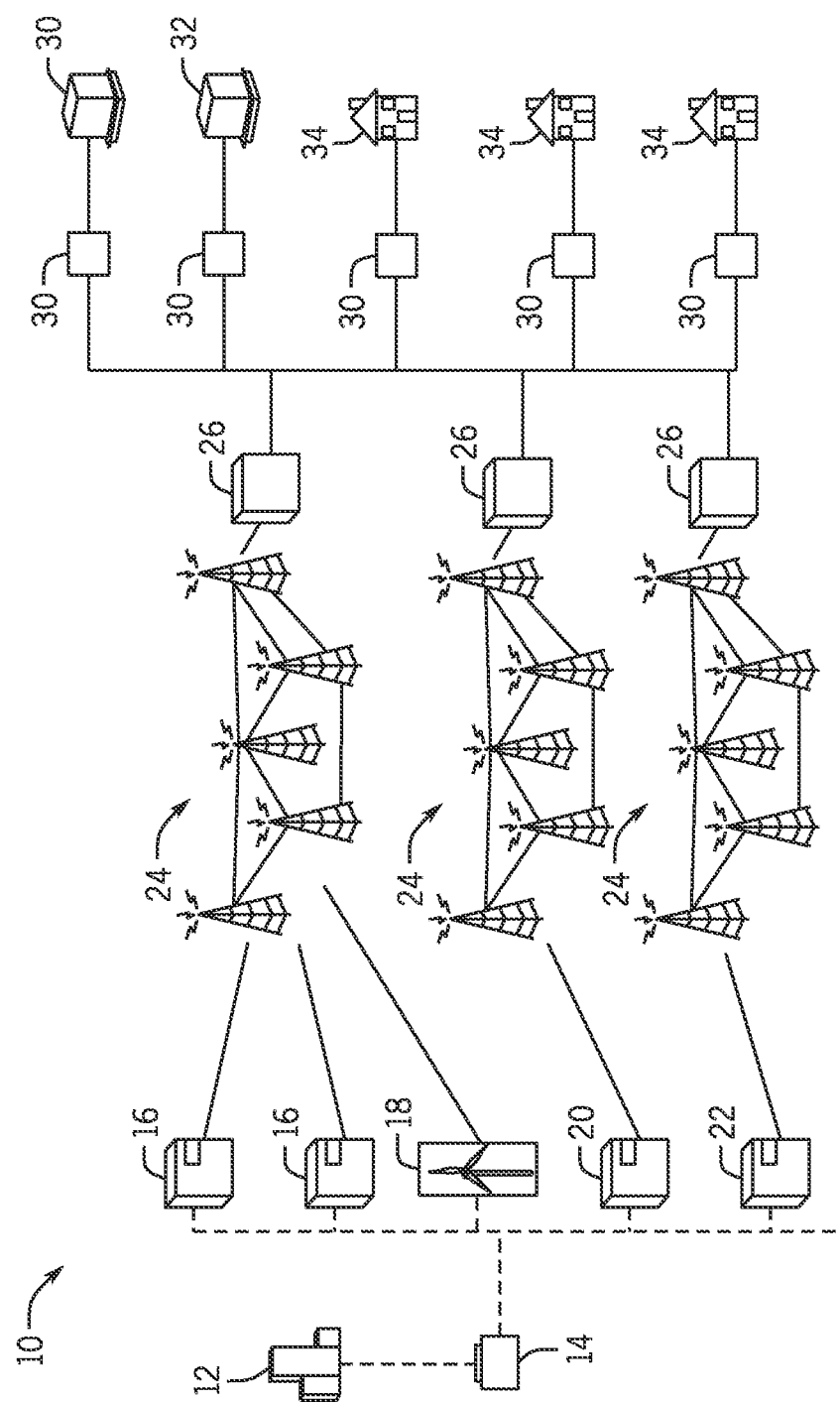
FIG. 1 is a block diagram of an embodiment of a energy generation, transmission, and distribution infrastructure system, in accordance with present embodiments.

With the foregoing in mind, it may be useful to describe an embodiment of an infrastructure, such as an example energy grid system 10 illustrated in FIG. 1. It should again be noted that the systems and methods described herein may apply to a variety of infrastructure, including but not limited to power distribution infrastructure, gas delivery infrastructure, and various fluid (e.g., water) delivery infrastructure. As depicted, the energy grid system 10 may include one or more utility providers 12. The utility provider 12 may provide for oversight operations of the energy grid system 10. For example, utility control centers 14 may monitor and direct power produced by one or more power generation stations 16 and alternative utility generation stations 18, 20, and 22. The power generation stations 16 may include conventional power generation stations, such as power generation stations using gas, coal, biomass, and other carbonaceous products for fuel. The alternative utility generation station 18 may include power generation stations using solar power, wind power, hydroelectric power, geothermal power, and other alternative sources of power (e.g., renewable energy) to produce electricity. Other alternative utility generation stations may include a water power producing plant 20 and geothermal power producing plant 22. For example, water power producing plants 20 may provide for hydroelectric power generation, and geothermal power producing plants 22 may provide for geothermal power generation.

The power generated by the power generation stations 16, 18, 20, and 22 may be transmitted through a power transmission grid 24. The power transmission grid 24 may cover a broad geographic region or regions, such as one or more municipalities, states, or countries. The transmission grid 24 may also be a single phase alternating current (AC) system, but most generally may be a three-phase AC current system. As depicted, the power transmission grid 24 may include a series of towers to support a series of overhead electrical conductors in various configurations. For example, extreme high voltage (EHV) conductors may be arranged in a three conductor bundle, having a conductor for each of three phases. The power transmission grid 24 may support nominal system voltages in the ranges of 110 kilovolts (kV) to 765 kilovolts (kV) or more. In the depicted embodiment, the power transmission grid 24 may be electrically coupled to a power distribution substation and grid 26. The power distribution substation and grid 26 may include transformers to transform the voltage of the incoming power from a transmission voltage (e.g., 765 kV, 500 kV, 345 kV, or 138 kV) to primary (e.g., 13.8 kV or 4160V) and secondary (e.g., 480V, 240V, or 120V) distribution voltages. For example, industrial electric power consumers (e.g., production plants) may use a primary distribution voltage of 13.8 kV, while power delivered to commercial and residential consumers may be in the secondary distribution voltage range of 120V to 480V.

As again depicted in FIG. 1, the power transmission grid 24 and power distribution substation and grid 26 may be part of the energy grid system 10. Accordingly, the power transmission grid 24 and power distribution substation 26 may include various digital and automated technologies to control power electronic equipment such as generators, switches, circuit breakers, reclosers, and so forth. In certain embodiments, the power transmission grid 24 and power distribution substation and grid 26 may also deliver power and communicate data such as changes in electric load demand to a utility meter 30.

In certain embodiments, the utility meter 30 may be an Advanced Metering Infrastructure (AMI) meter used to collect, measure, and analyze electric power consumption and/or generation. The utility meter 30 may be electrically and communicatively coupled to one or more of the components of the system 10, including the power transmission grids 24, power distribution substation and grid 26, and the commercial and/or industrial consumer 32 and residential consumer 34. Additionally, the utility meter 30 may enable two-way communication between commercial and residential consumers 32 and 34 and the utility control center 14, providing for a link between consumer behavior and electric power consumption and/or generation.

In certain embodiments, as depicted in FIG. 2, the utility meter 30 may be part of one or more communications networks 36 that may facilitate communication between the utility meter 30, a mobile device 38 (e.g., handheld device 38), auxiliary devices 40, and the utility control center 14 and/or utility provider 12. As illustrated, the utility meter 30 may include a system of electrical and/or electronic components such as, for example, a display 42, one or more processors 44, one or more memory devices 46, a network interface 47, and a unique identifier 48. The display 42 may be a liquid crystal display (LCD) used to display electricity consumption and/or generation in recorded time intervals or real-time. The one or more processors 44 may be communicatively coupled to the memory 48 to execute instructions for carrying out the presently disclosed techniques. These instructions may be encoded in code stored in tangible non-transitory computer-readable medium, such as the memory 48 and/or other storage. Indeed, the one or more processors 44 may include a general purpose processor, system-on-chip (SoC) device, or some other processor configuration that may be used to measure electricity consumption and/or generation in recorded time intervals or in real-time.

In certain embodiments, the network interface 47 may be used to allow the utility meter 30 to communicate in real-time or near real-time with the mobile device 38, the utility control center 14, and/or the auxiliary devices 40. Similarly, the unique identifier 48 of the utility meter 30

(e.g., which may be disposed on an interior or exterior portion of the utility meter 30) may be a quick response (QR) code, a bar code, a serial number, an electronic product code (EPC), an Aztec code, an encrypted identification code, a high capacity color barcode (HCCB), an alphanumeric key, a holographic image, or any system of characters and/or images that may be used to identify a particular device such as the utility meter 30. Furthermore, in addition to including identification information about the utility meter 30, the unique identifier 48 may include additional detailed information regarding the utility meter 30. For example, the unique identifier 48 may include data such as utility meter 30 type, utility meter 30 manufacturer, utility meter 30 location (e.g., geographical location), utility provider 12 identification, utility meter 30 capability, utility meter 30 configuration data and settings, utility meter 30 functionality, and so forth.

In one embodiment, as will be further appreciated, the unique identifier 48 may include one or more levels of encoded authentication (e.g., two-factor authentication (TFA), multi-factor authentication (MFA)) and/or authorization data that may include additional security codes, one-time short message service (SMS) passwords, additional personal identification numbers (PINS), digital certificates, authentication tokens, mobile signatures and/or digital signatures, network addresses, hidden pointers, and so forth. This may allow the mobile device 38, for example, to link (e.g., via a website or web portal of the utility provider 12) to data regarding consumer 32, 34 account information, consumer 32, 34 consumption data, utility meter 30 configuration data for specific consumers 32, 34, and/or access via the utility control center 14 to control access points to the utility meter 30, such as allowing the auxiliary devices 40 to pair to the utility meter 30.

Particularly, the mobile device 38 (e.g., handheld device 38) may be used to communicatively couple a number of the auxiliary devices 40 to the utility meter 30, and by extension, to the utility control center 14 and/or utility provider 12. It should be appreciated that the mobile device 38 may include any mobile and/or handheld device such as, for example, a cell phone (e.g., smartphone), personal digital assistant (PDA), a tablet computer, a laptop computer, a digital camera, a portable media player, a multi-meter, an interrogation device, an optical scanner (e.g., barcode scanner), and/or any of various other processor-based mobile devices (e.g., the mobile device 38 may include a processor similar to the processor 44 and a memory similar to the memory 46 of the utility meter 30) that may be used to read or decode the unique identifier 48, and communicatively couple to the utility meter 30. For example, in certain embodiments, the mobile device 38 may read the unique identifier 48 of the utility meter 30 by way of a camera 50 or other similar device capable of reading the unique identifier 48. Similarly, in another embodiment, the mobile device 38 read the unique identifier 48 via a short-range communication link 52, which may include, for example, a near-field communication (NFC) link, a Bluetooth link, a ZigBee link, an infrared (IrDA) link, a 6LoWPAN (e.g., IPv6 over low-power wireless personal area network) link, a radio frequency identification (e.g., RFID) link, a Z-wave link, a WirelessUSB link, and/or other similar short-range communication channel. The mobile device 38 may then process and transmit the unique identifier 48 of the utility meter 30 over a network 54 (e.g., a local area network (LAN), a wireless local area network (W-LAN) (Wi-Fi), a wide area network (WAN), a radio access network (RAN), cloud radio access network (C-RAN), a cellular network, or other similar network), to, for example, the utility control center 14 and/or utility provider 12.

As previously discussed, the unique identifier 48 may include a two-factor authentication (TFA) and/or multi-factor authentication (MFA) mechanism in which the user (e.g., utility technician, consumer 32, 34) of the mobile device 38 may use the mobile device 38 to satisfy the authentication and/or authorization requirements (e.g., that may be specified by the utility provider 12) to connect the mobile device 38 to the utility meter 30. For example, upon the user using the mobile device 38 to capture the unique identifier 48 (e.g., by way of the camera 50 or via the short-range communication link 52), the mobile device 38 may then process (e.g., decode the unique identifier 48 and/or demodulate a signal carrying the unique identifier 48 to ascertain identifying characteristics and/or patterns thereof) the unique identifier 48, and transmit a request to the utility control center 14 for access to the utility meter 30. The utility control center 14 and/or utility provider 12 may receive the request including the unique identifier 48 from the mobile device 38, and may then re-transmit a request over the network 54 to the mobile device 38 for further authentication and/or authorization (e.g., a second or third factor of authentication that may include a request for a private key, a digital certificate, a digital signature, an authentication token, a biometric input, and so forth) of the user. It should be appreciated that the request generated by the utility control center 14 and/or utility provider 12 may be based on data encoded in the unique identifier 48. Upon the user, for example, providing the additional authentication and/or authorization information via the mobile device 38 to the utility control center 14 and/or utility provider 12, the mobile device 38 may be allowed to communicatively couple to, or access the utility meter 30.

In certain embodiments, once the user is given communicative access and/or control of the utility meter 30 via the mobile device 38, the user may then retrieve configuration data 56 from the utility control center 14, or request that the utility control center 14 and/or utility provider 12 transmit (e.g., via the network 54) the configuration data 56 (e.g., software updates, operational parameter changes) to the utility meter 30. In other embodiments, once the user is given communicative access and/or control of the utility meter 30 via the mobile device 38, the user may then retrieve device information 58 (e.g., manufacturer identification, device type, internet protocol (IP) address) from the auxiliary devices 40 to communicatively couple (e.g., via the network 54) the auxiliary devices 40 to the utility meter 30. For example, the auxiliary devices 40 may include one or more domestic appliances (clothes dryer, heating ventilation and cooling (HVAC) units) or outdoor domestic equipment (e.g., electric car charge station) that the utility meter 30 may control for the purpose of energy efficiency once the utility meter 30 is paired with the auxiliary devices 40. Specifically, by first authenticating the user of the mobile device 38 and authorizing the mobile device 38 to couple to the utility meter 30, the mobile device 38 may be then used as a medium to couple the auxiliary devices 40, as well as future auxiliary devices, to the utility meter 30. In this way, the utility provider 12 may not need to dispense technicians, for example, to the consumer 32, 34 each time a new auxiliary device 40 is to be communicatively coupled to the utility meter 30 of the consumers 32, 34.

Turning now to FIG. 3, a flow diagram is presented, illustrating an embodiment of a process 60 suitable for authenticating and/or authorizing a mobile device (via an optical detection) to communicatively couple a utility meter to one or more auxiliary devices by using, for example, the mobile device 38 depicted in FIG. 2. Thus, the process 60 may include code or instructions stored in a non-transitory machine-readable medium (e.g., a memory of the mobile device 38) and executed, for example, by one or more processors included in the mobile device 38. The process 60 may begin with the mobile device 38 receiving (block 62) an indication to connect the utility meter 30 to one or more auxiliary devices 40. For example, as previously discussed, a user (e.g., technician or consumer 32, 34) of the mobile device 38 may desire to communicative couple one or more domestic appliances or other domestic equipment to the utility meter 30 via a network such as any of various HAN, LAN, or PAN networks. The process 60 may then continue with the mobile device 38 detecting (block 64) a unique identifier 48 of the utility meter 30 via a camera 50 of the mobile device 38. For example, as discussed with respect to FIG. 2, the mobile device 38 may read the unique identifier 48 of the utility meter 30, in which the unique identifier 48 may include, for example, a QR code, a bar code, a serial number, an EPC code, an Aztec code, an encrypted identification code, a HCCB code, an alphanumeric key, a holographic image, or other system of characters and/or images that may be used to identify a particular utility meter 30.

The process 60 may then continue with the mobile device 38 requesting (block 66) authentication acknowledgment from the utility provider 12 based on one or more authentication factors of the unique identifier 48. Specifically, the unique identifier 48 may include a two-factor authentication (TFA) and/or multi-factor authentication (MFA) mechanism in which the user (e.g., utility technician, consumer 32, 34) of the mobile device 38 may use the mobile device 38 to satisfy the authentication and/or authorization requirements to connect the mobile device 38 to the utility meter 30. For example, as previously noted, upon the user using the mobile device 38 to capture the unique identifier 48 by way of the camera 50, the mobile device 38 may then decode the unique identifier 48, and transmit a request to the utility control center 14 for access to the utility meter 30. The utility control center 14 and/or utility provider 12 may receive the request from the mobile device 38, and may then re-transmit a request over the network 54 to the mobile device 38 that may include a request for a private key, a digital certificate, an authentication token, a biometric input, or other mechanism useful in providing added security in authenticating the user of the mobile device 38. Upon the mobile device 38 receiving access to communicatively couple to, or communicatively access the utility meter 30, the process 60 may conclude with the mobile device 38 initiating (block 68) a connection between the utility meter 30 and the one or more auxiliary devices 40. Particularly, the mobile device 38 may be then used as a medium to couple the auxiliary devices 40, as well as future auxiliary devices, to the utility meter 30. In this way, the utility provider 12 may not need to dispense technicians, for example, to the consumer 32, 34 each time a new auxiliary device 40 is to be communicatively coupled to the utility meter 30 of the consumers 32, 34.

Similar to FIG. 3, FIG. 4 is a flow diagram illustrating an embodiment of a process 70 suitable for authenticating and/or authorizing a mobile device to communicatively couple a utility meter to one or more auxiliary devices (via a short-range communication channel) by using, for example, the mobile device 38 depicted in FIG. 2. Thus, in a similar manner to process 60, the process 70 may include code or instructions stored in a non-transitory machine-readable medium (e.g., a memory of the mobile device 38) and executed, for example, by one or more processors included in the mobile device 38. The process 70 may begin with the mobile device 38 receiving (block 72) an indication to connect the utility meter 30 to one or more auxiliary devices 40. For example, as previously discussed, a user (e.g., technician or consumer 32, 34) of the mobile device 38 may desire to communicative couple one or more domestic appliances or other domestic equipment to the utility meter 30 via a network such as any of various HAN, LAN, or PAN networks. The process 70 may then continue with the mobile device 38 detecting (block 74) a unique identifier 48 of the utility meter 30. For example, in this embodiment, the mobile device 38 may interrogate the utility meter 30 for the unique identifier 48 through a short-range communication link 52, which may include, for example, a near-field communication (NFC) link, a Bluetooth link, a ZigBee link, an infrared (IrDA) link, a 6LoWPAN (e.g., IPv6 over low-power wireless personal area network) link, a radio frequency identification (e.g., RFID) link, a Z-wave link, a WirelessUSB link, and/or other similar short-range communication channel.

The process 70 may then continue with the mobile device 38 requesting (block 76) authentication acknowledgment from the utility provider 12 based on one or more authentication factors of the unique identifier 48. As noted above with respect to FIG. 3, the unique identifier 48 may include a two-factor authentication (TFA) and/or multi-factor authentication (MFA) mechanism in which the user (e.g., utility technician, consumer 32, 34) of the mobile device 38 may use the mobile device 38 to satisfy the authentication and/or authorization requirements to connect the mobile device 38 to the utility meter 30. Upon the mobile device 38 receiving access to communicatively couple to, or communicatively access the utility meter 30, the process 70 may conclude with the mobile device 38 initiating (block 78) a connection between the utility meter 30 and the one or more auxiliary devices 40. Again, as previously noted, in this way, the utility provider 12 may not need to dispense technicians, for example, to the consumer 32, 34 each time a new auxiliary device 40 is to be communicatively coupled to the utility meter 30 of the consumers 32, 34. Furthermore, by providing a multifactor authentication (e.g., TFA, MFA) mechanism, the present embodiments may provide for added security in authenticating and/or authorizing users requesting access to utility meters.

Technical effects of the disclosed embodiments relate to systems and methods for communicatively coupling a mobile electronic device (e.g., a cell phone) to a utility meter to commission and synchronize one or more domestic auxiliary devices (e.g., indoor consumer appliances, outdoor electrical equipment, and so forth) with the utility meter. In particular, the mobile electronic device may retrieve a unique identifier of the utility meter, and request authentication and/or authorization from, for example, the utility provider to access certain functionalities of the utility meter. In certain embodiments, the authentication and/or authorization mechanism to couple the mobile electronic device to the utility meter may include two-factor authentication (TFA) or a multifactor authentication (MFA) mechanism that may require a user (utility technician or utility consumer) to satisfy at least two levels of authentication before being granted access to certain functionalities of the utility meter. However, once authenticated and/or authorized to access the utility meter by, for example, the utility provider, the mobile electronic device may be used as a gateway that may then directly connect present auxiliary devices or future auxiliary devices to the utility meter. In this way, the utility provider may not need to dispense technicians, for example, to the residences of consumers each time a new auxiliary device is to be connected to the utility meter. Thus, the present embodiments may vastly facilitate the coupling of auxiliary devices to utility meters, and by extension, to the utility providers, and may also provide for improved security in authenticating and/or authorizing users requesting access to such utility meters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A non-transitory computer-readable medium having computer executable instructions that, when executed by a processor, cause the processor to:
   receive an indication to capture, after initiating communication with a utility meter over a communication network, by a mobile electronic device, a unique identifier of the utility meter via the mobile electronic device;
   transmit, by the mobile electronic device to a utility control center, the unique identifier and an authentication mechanism;
   wherein after authentication of the mobile electronic device by the utility control center, the mobile electronic device is configured to control the utility meter via the communications network, wherein control of the utility meter includes authorization to pair a domestic auxiliary device to the utility meter via the communications network, wherein the domestic auxiliary device is a domestic appliance;
   retrieve, by the mobile electronic device, device information from the domestic auxiliary device;
   pair, by the mobile electronic device, the domestic auxiliary device to the utility meter via the communications network, wherein the pairing is based on the device information gathered from the domestic auxiliary device; and
   wherein, once the utility meter and domestic auxiliary device are paired, control of the utility meter by the mobile electronic device includes an ability to regulate a utility consumption of the domestic auxiliary device.

2. The non-transitory computer-readable medium of claim 1, wherein the unique identifier is captured via one of a quick response (QR) code, a bar code, a serial number, an electronic product code (EPC), an Aztec code, an encrypted identification code, a high capacity color barcode (HCCB), an alphanumeric key, and a holographic image.

3. The non-transitory computer-readable medium of claim 1, wherein the authentication mechanism includes a first factor of user authentication and a second factor of user authentication.

4. The non-transitory computer-readable medium of claim 3, wherein the first factor of user authentication includes a pattern of the unique identifier, and wherein the second factor of user authentication a private key, a digital certificate, a digital signature, an authentication token, a biometric input, or any combination thereof.

5. The non-transitory computer-readable medium of claim 1, wherein control of the utility meter includes control of an operational parameter of the utility meter via the mobile electronic device.

6. The non-transitory computer-readable medium of claim 1, wherein control of the utility meter includes authorization to pair a plurality of domestic auxiliary devices to the utility meter via the communications network.

7. The non-transitory computer-readable medium of claim 1, wherein the unique identifier is captured via one of a near-field communication (NFC) link, a Bluetooth communication link, a ZigBee communication link, an infrared (IrDA) communication link, a 6LoWPAN communication link, a radio frequency identification (RFID) communication link, a Z-wave communication link, and a WirelessUSB communication link.

8. A system, comprising:
   a utility meter, the utility meter comprising a unique identifier that is configured to be captured by a mobile electronic device;
   a utility command center;
   wherein each of the utility meter and the utility command center is in communication with a communication network;
   wherein the utility command center is configured to authenticate a mobile electronic device requesting access to the utility meter via the communication network based on a unique identifier of the utility meter and an authentication mechanism received from the mobile electronic device;
   wherein after authentication of the mobile electronic device by the utility command center, the utility command center allows the mobile electronic device to control the utility meter via the communications network, wherein control of the utility meter includes authorization to pair a domestic auxiliary device to the utility meter via the communications network, wherein the domestic auxiliary device is a domestic appliance, wherein the domestic auxiliary device is paired based on device information gathered by the mobile electronic device from the domestic auxiliary device; and
   wherein, once the utility meter and domestic auxiliary device are paired, control of the utility meter by the mobile electronic device includes an ability to regulate a utility consumption of the domestic auxiliary device.

9. The system of claim 8, wherein the unique identifier is configured to be captured via one of a quick response (QR) code, a bar code, a serial number, an electronic product code (EPC), an Aztec code, an encrypted identification code, a high capacity color barcode (HCCB), an alphanumeric key, a holographic image, or any combination thereof.

10. The system of claim 8, wherein the authentication mechanism includes a first factor of user authentication and a second factor of user authentication.

11. The system of claim 10, wherein the first factor of user authentication includes a pattern of the unique identifier, and wherein the second factor of user authentication a private key, a digital certificate, a digital signature, an authentication token, a biometric input, or any combination thereof.

12. The system of claim 8, wherein control of the utility meter includes control of an operational parameter of the utility meter via the mobile electronic device.

13. The system of claim 8, wherein control of the utility meter includes authorization to pair a plurality of domestic auxiliary devices to the utility meter via the communications network.

14. The system of claim 8, wherein the unique identifier is configured to be captured via a near-field communication (NFC) link, a Bluetooth communication link, a ZigBee communication link, an infrared (IrDA) communication link, a 6LoWPAN communication link, a radio frequency identification (RFID) communication link, a Z-wave communication link, a WirelessUSB communication link, or any combination thereof, established between a handheld electronic device and the utility meter.

15. The system of claim 8, wherein after authentication of the mobile electronic device by the utility command center, the utility command center allows the mobile electronic device to retrieve configuration data from the utility command center.

16. The system of claim 8, wherein after authentication of the mobile electronic device by the utility command center, the utility command center allows the mobile electronic device to request that the utility command center transmit configuration data to the utility meter.

17. The non-transitory computer-readable medium of claim 1, comprising computer-readable instructions that, when executed by the processor, cause the processor to retrieve configuration data from a utility control center.

18. The non-transitory computer-readable medium of claim 1, comprising computer-readable instructions that, when executed by the processor, cause the processor to request that the utility control center transmit configuration data to the utility meter.

\* \* \* \* \*